US012162406B2

(12) United States Patent
Betro' et al.

(10) Patent No.: US 12,162,406 B2
(45) Date of Patent: Dec. 10, 2024

(54) ROAD VEHICLE EQUIPPED WITH A REPRODUCTION DEVICE FOR THE REALIZATION OF A SOUND THAT CAN BE ASSOCIATED WITH AN ELECTRIC MOTOR AND RELATED METHOD

(71) Applicant: FERRARI S.p.A., Modena (IT)

(72) Inventors: Roberto Betro', Modena (IT); Andrea Benoit Abbiati, Modena (IT); Ugo Sitta, Modena (IT); Samuele Arcangeli, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 169 days.

(21) Appl. No.: 17/847,566

(22) Filed: Jun. 23, 2022

(65) Prior Publication Data
US 2023/0001853 A1    Jan. 5, 2023

(30) Foreign Application Priority Data
Jul. 1, 2021    (IT) .................. 102021000017408

(51) Int. Cl.
*H04R 23/00* (2006.01)
*B60Q 5/00* (2006.01)
(Continued)

(52) U.S. Cl.
CPC .............. *B60Q 5/008* (2013.01); *H04R 3/04* (2013.01); *H04R 3/12* (2013.01)

(58) Field of Classification Search
CPC .. H04R 2499/13; B60Q 2270/42; H02P 27/08
See application file for complete search history.

(56) References Cited

U.S. PATENT DOCUMENTS

| 8,212,505 B2 * | 7/2012 | Nagashima | ........... B60L 15/025 180/65.21 |
| 10,193,489 B2 * | 1/2019 | Son | ........... H02P 27/08 |

(Continued)

FOREIGN PATENT DOCUMENTS

| CN | 114666713 A | * 6/2022 |
| DE | 102010043973 A1 | 5/2012 |

(Continued)

OTHER PUBLICATIONS

Extended European Search Report for EP Application No. 22181946.9-1001; Dated—Nov. 28, 2022; 20 pages.

(Continued)

*Primary Examiner* — Ryan Robinson
(74) *Attorney, Agent, or Firm* — CANTOR COLBURN LLP

(57) ABSTRACT

Road vehicle comprising at least one electric motor; an acoustic system, which comprises at least one reproduction device, which generates a sound that can be associated with the electric motor; wherein the electric motor is mechanically connected to the reproduction device so as to be able to excite a resonant frequency thereof; and a control unit configured to control the electric motor so as to inject at least one sonority current or voltage, as an input, to the electric motor itself; wherein said at least one sonority current or voltage excites a frequency resulting in a vibration of said at least one reproduction device, which emits, due to the vibration, in the form of acoustic waves, a sound as a function of the injected sonority current or voltage.

13 Claims, 3 Drawing Sheets

(51) Int. Cl.
      *H04R 3/04*     (2006.01)
      *H04R 3/12*     (2006.01)

(56)           References Cited

U.S. PATENT DOCUMENTS 10,319,360  B1 *   6/2019   He .................... G10K 11/1752
       11,362,609  B2 *   6/2022   Chang .................... H02P 21/26
       11,462,206  B2 *  10/2022   Chang ..................... G10K 9/10
    2003/0142963   A1 *   7/2003   Nadeau ..................... H02P 7/29
                                                                  388/804
    2010/0134058   A1     6/2010   Nagashima et al.
    2014/0177866   A1     6/2014   Peachey et al.
    2016/0205472   A1     7/2016   Violi et al.
    2017/0149365   A1 *   5/2017   Burger ................... G05B 19/02
    2020/0410827   A1 *  12/2020   Lemaitre ............. H02P 23/0004

FOREIGN PATENT DOCUMENTS

DE       102015208211  A1    11/2016
    GB            2509132  A      6/2014

OTHER PUBLICATIONS

Search Report for Italian Application No. 102021000017408, completed Mar. 3, 2022, 13 pages.

* cited by examiner

ROAD VEHICLE EQUIPPED WITH A REPRODUCTION DEVICE FOR THE REALIZATION OF A SOUND THAT CAN BE ASSOCIATED WITH AN ELECTRIC MOTOR AND RELATED METHOD

CROSS-REFERENCE TO RELATED APPLICATIONS

This patent application claims priority from Italian patent application no. 102021000017408 filed on Jul. 1, 2021, the entire disclosure of which is incorporated herein by reference.

TECHNICAL SECTOR

The invention relates to a road vehicle equipped with a reproduction device for the realization of a sound that can be associated with an electric motor and to a related method.

PRIOR ART

In a high-performance sports car, the sound produced by the engine (usually, an internal combustion engine) and perceived inside the passenger compartment is important, for a significant part of the "driving pleasure" of a high-performance sports car is due to the very sound produced by the engine.

Furthermore, the sound generated by the engine allows drivers to have an immediate feedback on the conditions of the vehicle and on what, for example while driving on a track, has to be done in order to reach given performances.

Furthermore, among the main features of the sound produced by the engine and perceived inside the passenger compartment there are not only the intensity of the sound, but also the "quality" of the sound itself (namely, the sound produced by the engine and perceived inside the passenger compartment not only needs to be "strong", but also has to be "good").

Due to the recent development of electric drive cars, traditional internal combustion engines have been replaced by electric machines (hereinafter also referred to as electric motors), which, however, are extremely quiet, thus reducing the driving pleasure in high-performance vehicles.

As a matter of fact, they do not produce a characteristic sound, which can be enjoyed by a driver of a high-performance car.

As a consequence, in high-performance sports car, the sound produced by an electric motor is not perceived inside the passenger compartment or, anyway, can be at least partially disappointing.

DESCRIPTION OF THE INVENTION

The object of the invention is to provide a road vehicle equipped with a reproduction device for the realization of a sound that can be associated with an electric motor and a related method, which are easy and economic to be manufactured and implemented and are at least partially free from the drawbacks discussed above, namely allow the driver and the passengers to enjoy, inside the passenger compartment, a quality sound, which, hence, is very pleasant for them.

According to the invention, there are provided a road vehicle equipped with a reproduction device for the realization of a sound that can be associated with an electric motor and a related method as claimed in the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
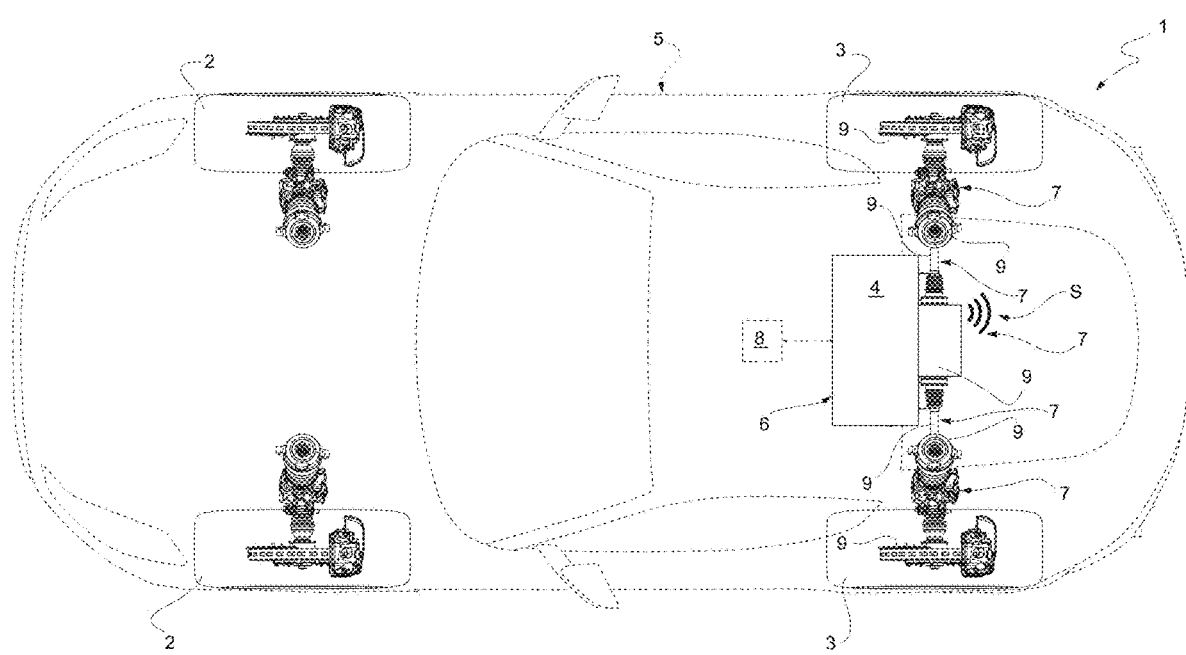
FIG. 1 is a schematic view of a car according to the invention.

In FIG. 1, number 1 indicates, as a whole, a car provided with two front wheels 2 and two rear drive wheels 3, which receive the torque from a an electric motor 4 arranged in a rear position. The car 1 is provided with a passenger compartment 5 which is designed to house the driver and possible passengers. In other embodiments, the electric motor 4 can obviously be arranged in a front position.

According to FIG. 1, the car 1 comprises an acoustic system 6, which has the function of generating a sound through the electric motor 4, so that the sound perceived by the people seating in the passenger compartment 5 of the car 1 is "pleasant", namely corresponds to the desires/expectations of the occupants of the passenger compartment 5 of the car 1, and/or is useful while driving in order to understand the conditions of the motor.

The acoustic system 6 comprises at least one reproduction device 7, which generates the sound that can be associated with the electric motor 4 and diffuses the sound itself towards the passenger compartment 5 and/or out of the vehicle 1.

Therefore, the acoustic system 6 comprises the electric motor 4, which is mechanically connected to the reproduction device 7 so as to be able to excite a resonant frequency thereof.

Furthermore, the acoustic system 6 comprises a control unit 8 configured to control the electric motor 4 so as to inject at least one sonority current $I_{qS}$, $I_{dS}$ (direct and in quadrature) or voltage $V_{qS}$, $V_{dS}$ (hereinafter also simply referred to as sonority signal, for the sake of brevity), as an input, into the electric motor 4 (see, for example, FIG. 2). In particular, the sonority signal (namely, the sonority current $I_{qS}$, $I_{dS}$) excites a frequency, which determines a vibration of the reproduction device 7, which emits, due to the vibration, in the form of acoustic waves, a sound S as a function of the injected sonority current $I_{qS}$, $I_{dS}$ or voltage $V_{qS}$, $V_{dS}$.

In particular, the generated sound can be associated with the electric motor 4. More in particular, the generated sound S is such that it can be perceived from the outside and from the inside of the vehicle 1 as deriving from the dynamics of the electric motor 4 (so as to recall the sensation generated by the dynamics of an internal combustion engine).

The features indicated below relating to the sonority current $I_{qS}$, $I_{dS}$ also apply to the sonority voltage $V_{qS}$, $V_{dS}$.

In particular, the reproduction device 7 is determined by a mechanical resonant element 9, preferably already present on board the road vehicle 1. More in particular, the mechanical resonant element 9 is any element of an electric transmission comprising the electric motor 4, namely mechanically connected to the stator of the electric motor 4 or the stator itself. For example, the mechanical element 9 is an axle, a gearbox, a differential, a rim of a wheel, a lid of a cable raceway, a support, a plug of an axle, a fixing bar, etcetera. In this way, no additional components have to be installed.

Advantageously, though not necessarily, the resonant element 9 is a metal element.

Is some non-limiting cases, the resonant element 9 is an element made of a plastic or composite material.

Figure 2:
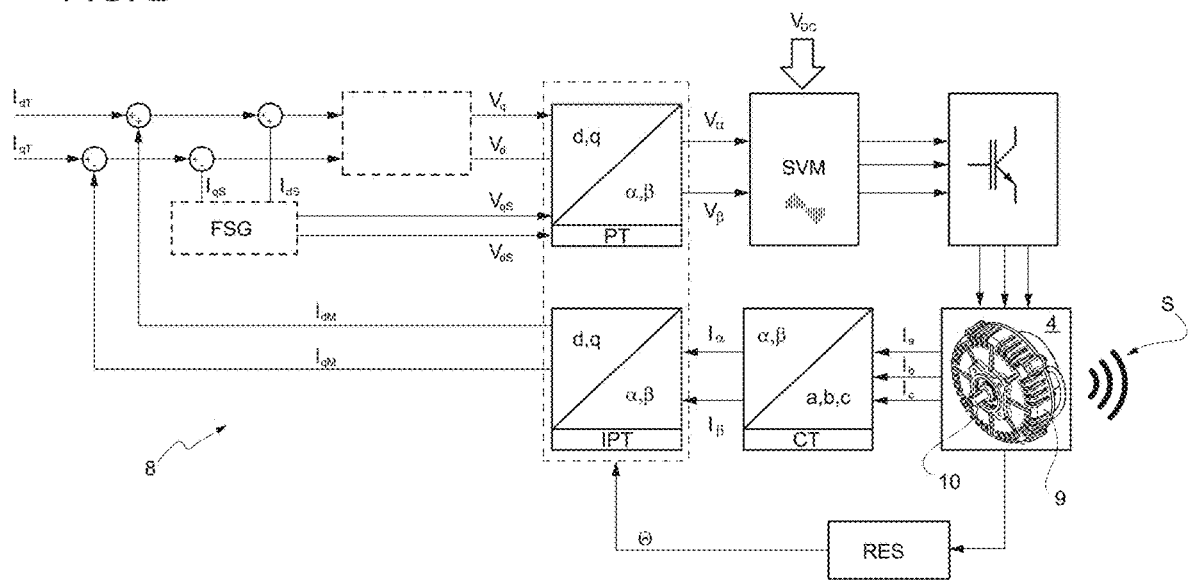
FIG. 2 is a possible embodiment of a control diagram of an electric motor of the vehicle of FIG. 1.

In the non-limiting embodiment of FIG. 1 or 2, the electric motor 4 is configured to cause the rotation of the rear drive wheels 3. In other non-limiting cases, the vehicle 1 comprises two electric motors 4, one for each drive wheel.

In other non-limiting embodiments, the motor 4 is an additional motor added to the one needed to move the road vehicle 1.

Advantageously, though not necessarily, therefore, the control unit 8 injects, simultaneously with the sonority current $I_{qS}$, $I_{dS}$, a current $I_{qT}$, $I_{dT}$ of movement (namely, the reference currents shown in the diagram of FIG. 3), which determines the rotation of a rotor 10 of the electric motor 4 and, hence, of the drive wheels 3 connected thereto, thus controlling the movement of the vehicle 1. Alternatively, the control unit 8 injects, simultaneously with the sonority voltage $V_{qS}$, $V_{dS}$, a voltage $V_{qT}$, $V_{dT}$ of movement (namely, the reference voltages shown downstream of a PI controller, for example a proportional-integral controller, in the diagram of FIG. 3), which determines the rotation of the rotor 10 of the electric motor 4 and, hence, of the drive wheels 3 connected thereto, thus controlling the movement of the vehicle 1.

According to some preferred, though non-limiting embodiments, the sonority current $I_{qS}$, $I_{dS}$ has a frequency such that it does not interact with a magnetic flux of the electric motor 4, thereby avoiding generating movements of the rotor 10 and, hence, of the drive wheels 3. In this way, the injection of the harmonics of current $I_{qS}$, $I_{dS}$ that give a sound contribution is independent of the speed of the motor 4. In other words, the control unit 8 is capable of controlling the electric motor 4 so as to emit the sound S even when the motor 4 is still or the rotor 10 has a constant speed. Therefore, in these cases, the injection of the sonority current $I_{qS}$, $I_{dS}$ added to (overlapping) the current $I_{qT}$, $I_{dT}$ of movement only allows the electric machine to make a sound, without determining movements or error in the movement of the road vehicle 1.

According to some non-limiting embodiments, the sonority current $I_{qS}$, $I_{dS}$ comprises (is) a harmonic signal with a square waveform or with a non-sinusoidal form.

According to other preferred non-limiting embodiments, the sonority current $I_{qS}$, $I_{dS}$ comprises (is) a sinusoidal harmonic signal. In particular, the sinusoidal form of the harmonic current signal provides the resonant element 9 with a greater resonance stimulus, allowing, at the same time, the sound S to gain a better quality compared to harmonics with a square waveform.

Advantageously, though not necessarily, the sonority current $I_{qS}$, $I_{dS}$ comprises a plurality of harmonics with different order and/or amplitude and/or frequency. In this way, a polyphonic sound S can be generated, determining the vibration of different resonant elements 9. In particular, by injecting sonority currents $I_{qS}$, $I_{dS}$ in a plurality of harmonics of different order, it is possible to excite the resonant frequencies of different elements 9, which, by vibrating, generate different sounds S (in particular, notes). By so doing, chords can be generated, thus enriching the sounds S. Hence, in other words, the control unit 8, through the electric motor 4, is capable of exciting different orders overlapping different harmonics within the sonority signals $I_{qS}$, $I_{dS}$, thus obtaining a polyphony. Therefore, the vehicle 1 is able to generate, through the motor 4, multi-frequency/multi-amplitude signals, which simultaneously excite different orders of harmonics.

According t some preferred non-limiting embodiments, the control unit 8 is configured to vary the sonority current $I_{qS}$, $I_{dS}$ as a function of vehicular conditions, for example road roughness and/or open or closed sunroof. In other words, the control unit 8 is configured to change the order, the amplitude or the frequency of the harmonic of the sonority current $I_{qS}$, $I_{dS}$, emitting a different sound as the conditions of the vehicle change.

According to a possible embodiment, the control unit 8 is configured to vary the sonority current $I_{qS}$, $I_{dS}$ as a function of driving parameters.

In some non-limiting cases, the control unit 8 is configured to detect the driving style of a driver according to known techniques, which, therefore, are not discussed in detail below; in particular, the control unit 8 is configured to vary the sonority signal $I_{qS}$, $I_{dS}$ as a function of the driving style of the driver.

In particular, as a function of the aforesaid driving parameters or vehicular conditions, the sonority signals can be varied so as to best adjust the sound reproduction that can be associated with the electric motor 4 to the driving situation themselves. For instance, the sonority signal could change as a function of the engaged gear (lower gears correspond to a more intense and low-frequency sound that can be associated with the electric motor 4), the position of the accelerator pedal (the more the accelerator pedal is pressed, the more intense the sound that can associated with the electric motor 4 is), the driving mode chosen through the suitable selector (commonly called "hand lever", a sports/racing driving mode corresponding to a more intense sound that can be associated with the electric motor 4), the position of a possible sunroof (the sound that can be associated with motor 4 is more intense when the sunroof is open), the first time derivative of the speed of rotation of the electric motor 4 (the sound that can be associated with the electric motor 4 becomes more intense as the derivative increases).

Advantageously, though not necessarily, the sonority current $I_{qS}$, $I_{dS}$ is configured to excite the reproduction device 7 to generate an increasing or decreasing sonic ramp. In particular, the sonic ramp is adjusted as a function at least of the acceleration of the road vehicle. In this way, in accordance with the acceleration, the sound S is more intense and acute as the acceleration of the vehicle increases, and vice versa.

In some non-limiting cases, the control unit 8 is configured to stimulate the resonances of the element 9 through the direct sonority component $I_{qS}$. Alternatively or in addition, the control unit 8 is configured to select the order within the structural resonance.

According to a second aspect of the invention, there is provided a method for the realization of a sound S that can be associated with an electric motor 4 in the road vehicle 1.

In particular, the method comprises the steps of:
injecting the sonority current $I_{qS}$, $I_{dS}$, as an input, into the electric motor; wherein the sonority current $I_{qS}$, $I_{dS}$, excites a frequency resulting in a vibration the mechanical resonant element 9 already present on board the road vehicle; wherein the resonant element 9 emits, due to the vibration, in the form of acoustic waves, a sound S as a function of the injected sonority current $I_{qS}$, $I_{dS}$.

Furthermore, the method preferably entails preliminarily defining (in a designing phase) the resonance orders of the components of the electric transmission system, so as to accordingly calculate the orders of the harmonics that, through resonance, can emit given notes, exciting, through vibration, the aforesaid components.

In particular, the harmonic order needed to emit a given sound S depends on the type of electric motor and on the structure connected to the latter (for example, the electric transmission system).

Advantageously, though not necessarily, the method further entails experimentally carrying out a "tuning" of the sonority current $I_{qS}$, $I_{dS}$ so as to centre the resonance bands as a function of the electric transmission system.

In particular, to sum up, the control unit 8 is configured to control (for example, by means of a known inverter) the electric motor 4 so as to apply voltages at the ends of the inverter, which generate sinusoidal current forms according to the description above. More in particular, sinusoidal harmonics are caused to overlap the currents $I_{qT}$, $I_{dT}$ of movement and said sinusoidal harmonics excite the structural resonances of the electric transmission system or of the electric motor 4 itself. Said harmonics are further modulated in amplitude and frequency to generate the sound S. Preferably, these harmonics have a frequency such that they do not interact with a magnetic flux of the electric motor 4, thus being filtered by the latter. In particular, said harmonics belong to a different order than the harmonics of movement.

The non-limiting embodiment of FIG. 2 shows a schematic representation of the control diagram used to control the electric motor 4 so as to emit the sound S.

In particular, a sonority generation block FGS adds, to the currents $I_{qT}$, $I_{dT}$ of movement, the sonority currents $I_{qS}$, $I_{dS}$ inputted to a proportional-integral controller PI, which processes the voltage signals $V_d$, $V_q$ (direct and in quadrature), which are total voltage signals (or, in some embodiments, signals of sole movement). In any case, the sonority voltage signals $V_{dS}$, $V_{qS}$ are added to the signals of movement and are subsequently sent to the electric motor 4 according to a known diagram, which is partly shown in FIG. 2, wherein PT and IPT indicate Park transform and the inverse transform thereof, respectively, CT indicates Clarke transform, RES indicates a resolver and, therefore, θ indicates the position of the rotor. In particular, block SVM indicates an example of modulation, in this case the space vector modulation (namely, the known algorithm used to control the PWM of an electric motor), which receives, as an input, a reference $V_{DC}$ for the modulated discretization of the input signal. Finally, the feedback currents $I_{dM}$, $I_{qM}$ indicate the measured stator currents.

Advantageously, though not necessarily, as the speeds of the rotor 10 of the electric motor 4 change, the orders of the harmonics used for the sonority currents $I_{qS}$, $I_{dS}$ change as well (namely, are changed by the control unit 8). In particular, though not in a limiting manner, as the speed of the rotor 10 of the electric motor 4 increases, the orders of the harmonics used for the sonority currents $I_{qS}$, $I_{dS}$ decrease and/or vice versa. In this way, the quality of the sound emitted by the resonant element 9 is better, avoiding disturbances relating to the speed of the motor 10.

Figure 3:
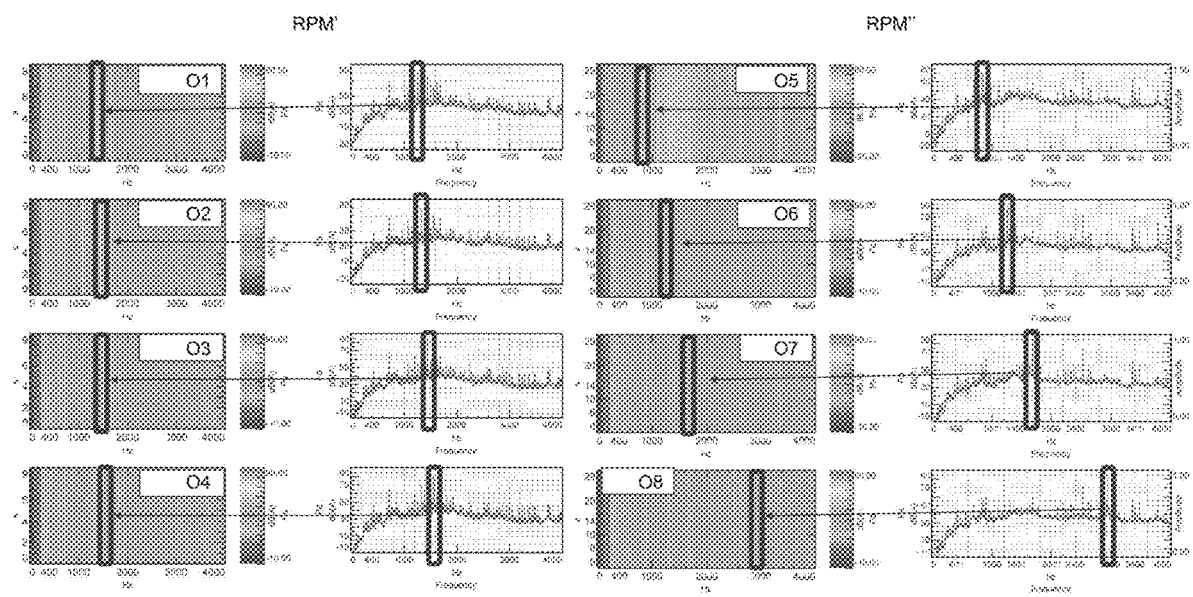
FIG. 3 is a view of some experimental results, which prove the effects of the invention.

FIG. 3 shows examples of the results obtained by the vehicle or by the method according to the invention. In particular, FIG. 3 shows the samples of sounds S generated by injecting, at given speeds RPM', RPM''' of the rotor 10, sonority currents $I_{qS}$, $I_{dS}$ with different orders (O1-O4 at the speed RPM' and O5-O8 at the speed RPM'''). In particular, RPM' corresponds to a speed of circa 1200 revolutions per minute and O1-O4 are orders greater than the fifteenth one, in particular greater than the twentieth one. Furthermore, RPM''' corresponds to a speed of circa 8000 revolutions per minute and O5-O8 are orders smaller than the fifteenth one, in particular smaller than the tenth one. As you can see, the vehicle 1 is able to modulate the sonority current $I_{qS}$, $I_{dS}$ so as to produce sounds S with intensities that are even equal to or greater than 90 dB.

Even though the invention described above relates to a specific embodiment, it should not be considered as limited to said embodiment, for its scope of protection also includes all those variants, changes or simplifications covered by the appended claims, such as for example a different type of arrangement, a different type of materials, a different geometric configuration, etc.

The embodiments described herein can be combined with one another, without for this reason going beyond the scope of protection of the invention.

The method and the vehicle 1 described above have numerous advantages.

First of all, the acoustic system 6 generates a sound through the electric motor 4 by exciting structural resonances with multiple sinusoidal harmonics, which make the sound pleasant (and, hence, welcome) for the occupants of the passenger compartment.

Furthermore, the acoustic system 6 is simple and economic to be manufactured, since its creation does not affect components already present in the car 1, changing them (and, hence, significantly increasing manufacturing costs for the adjustment of already produced mechanical parts), but it simply requires an implementation from a software point of view and, if necessary, the addition of small-size devices and units with a limited weight.

Finally, the acoustic system 6 ensures a reliable feedback, which can immediately be used by the driver of the road vehicle 1, who, despite driving a car provided with an electric motor and, hence, quiet, can understand the conditions of the vehicle using the hearing.

LIST OF THE REFERENCE NUMBERS OF THE FIGURES 1 vehicle
2 front wheels
3 rear wheels
4 electric motor
5 passenger compartment
6 acoustic system
7 reproduction device
8 control unit
9 resonant element
10 rotor
CT Clarke transform
$D$, $Q$ direct and quadrature
$F_{sG}$ sonority generator
$I_{dM}$ measured current
$I_{dS}$ sonority current
$I_{dT}$ current of movement
IPT Park inverse transform
$I_{qM}$ measured current
$I_{qS}$ sonority current
$I_{qT}$ current of movement
O1 order
O2 order
O3 order
O4 order
O5 order O6 order
O7 order
O8 order
PI controller
PT Park transform
RES resolver
RPM' revolutions per minute
RPM''' revolutions per minute
SWM modulator
$V_d$ total voltage
$V_{DC}$ modulation reference voltage
$V_{dS}$ sonority voltage
$V_q$ total voltage
$V_q s$ sonority voltage
θ rotor position

The invention claimed is:

1. Road vehicle (1) comprising:
   at least one electric motor (4);
   an acoustic system (6) comprising at least one reproduction device (7) configured to generate a sound that can be associated with the electric motor (4);
   wherein the acoustic system (6) comprises:
   the electric motor (4) mechanically connected to the reproduction device (7) so as to be able to excite a resonant frequency thereof; and
   a control unit (8) configured to control the electric motor (4) so as to inject at least one sonority current ($I_{qS}$, $I_{dS}$) or voltage ($V_{qS}$, $V_{dS}$) as an input of the electric motor (4) itself; wherein the at least one sonority current ($I_{qS}$, $I_{dS}$) or voltage ($V_{qS}$, $V_{dS}$) excites a frequency resulting in a vibration of the at least one reproduction device (7), which emits, due to the vibration, in the form of acoustic waves, a sound (S) as a function of the injected sonority current ($I_{qS}$, $I_{dS}$) or voltage ($V_{qS}$, $V_{dS}$);
   the vehicle being characterized in that, as the speed of the electric motor (4) changes, the control unit (8) is configured to change the harmonic orders of the at least one sonority current ($I_{qS}$, $I_{dS}$) or voltage ($V_{qS}$, $V_{dS}$).

2. Road vehicle (1) according to claim 1, wherein the reproduction device (7) is determined by a mechanical resonant element (9) arranged on board the road vehicle (1).

3. Road vehicle (1) according to claim 1, wherein the electric motor (4) is configured to bring one or two drive wheels (4) into rotation; wherein the control unit (8) injects, simultaneously with the sonority current ($I_{qS}$, $I_{dS}$) or voltage ($V_{qS}$, $V_{dS}$), a current ($I_{qT}$, $I_{dT}$) of movement, determining the rotation of a rotor (10) of the electric motor (4) and thus of the one or two drive wheels (3) connected thereto.

4. Road vehicle (1) according to claim 3, wherein the sonority current ($I_{qS}$, $I_{dS}$) or voltage ($V_{qS}$, $V_{dS}$) has a frequency such that it does not interact with a magnetic flux of the electric motor (4), thereby avoiding generating movements of the rotor (10).

5. Road vehicle (1) according to claim 1, wherein the resonant element (9) is a mechanical element (9) already arranged on board the vehicle (1), in particular any element (9) of an electric transmission comprising the electric motor (4).

6. Road vehicle (1) according to claim 1, wherein the sonority current ($I_{qS}$, $I_{dS}$) or voltage ($V_{qS}$, $V_{dS}$) comprises at least one sinusoidal harmonic signal.

7. Road vehicle (1) according to claim 1, wherein the sonority current ($I_{qS}$, $I_{dS}$) or voltage ($V_{qS}$, $V_{dS}$) comprises a plurality of harmonics of different order and/or amplitude and/or frequency, so as to generate a polyphonic sound (S) by determining the vibration of different reproduction devices (7).

8. Road vehicle (1) according to claim 1, wherein the control unit (8) is configured to vary the sonority current ($I_{qS}$, $I_{dS}$) or voltage ($V_{qS}$, $V_{dS}$) as a function of vehicular conditions, for example road roughness and/or open or closed sunroof.

9. Road vehicle (1) according to claim 1, wherein the control unit (8) is configured to vary the sonority current ($I_{qS}$, $I_{dS}$) or voltage ($V_{qS}$, $V_{dS}$) as a function of driving parameters, for example the position of a button and/or a driving mode and/or the position or change in position of a pedal.

10. Road vehicle (1) according to claim 1, wherein the control unit (8) is configured to vary the sonority current ($I_{qS}$, $I_{dS}$) or voltage ($V_{qS}$, $V_{dS}$) as a function of the driving style of a driver.

11. Road vehicle (1) according to claim 1, wherein the sonority current ($I_{qS}$, $I_{dS}$) or voltage ($V_{qS}$, $V_{dS}$) is configured to excite the reproduction device (7) to generate an increasing or decreasing sonic ramp.

12. Road vehicle (1) according to claim 11, wherein the sonic ramp is adjusted as a function of at least the acceleration of the road vehicle (1).

13. A method for realizing a sound that can be associated with a electric motor (4) in a road vehicle (1); the method comprising the step of:
   injecting a sonority current ($I_{qS}$, $I_{dS}$) or voltage ($V_{qS}$, $V_{dS}$) as an input of an electric motor (4); wherein the at least one sonority current ($I_{qS}$, $I_{dS}$) or voltage ($V_{qS}$, $V_{dS}$) excites a frequency resulting in a vibration of an at least one resonant element (9) present on the road vehicle (1); wherein the resonant element (9) emits, due to the vibration, in the form of acoustic waves, a sound (S) as a function of the injected sonority current ($I_{qS}$, $I_{dS}$) or voltage ($V_{qS}$, $V_{dS}$);
preliminarily defining proper orders of harmonics for the resonance of components of an electrical transmission system;
   experimentally carrying out a "tuning" of the sonority current ($I_{qS}$, $I_{dS}$) or voltage ($V_{qS}$, $V_{dS}$) so as to center the resonance bands as a function of the electrical transmission system.

* * * * *